(12) United States Patent
Schaaf et al.

(10) Patent No.: US 7,175,531 B2
(45) Date of Patent: Feb. 13, 2007

(54) CONSTANT VELOCITY FIXED JOINT AND ASSEMBLY METHOD

(75) Inventors: Gregor Schaaf, Braunschweig (DE); Gerhard Kaiser, Isenbüttel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 11/251,487

(22) Filed: Oct. 14, 2005

(65) Prior Publication Data

US 2006/0063596 A1 Mar. 23, 2006

Related U.S. Application Data

(63) Continuation of application No. PCT/EP04/03481, filed on Apr. 1, 2004.

(30) Foreign Application Priority Data

Apr. 14, 2003 (DE) ............... 103 17 146

(51) Int. Cl.
*F16D 3/224* (2006.01)
(52) U.S. Cl. ................... 464/145; 464/906
(58) Field of Classification Search ........... 29/898.065, 29/898.067; 464/145, 906; 384/523, 534
See application file for complete search history.

(56) References Cited

U.S. PATENT DOCUMENTS 2,755,149 A * 7/1956 Megel et al. ....... 29/898.067 X
4,054,038 A * 10/1977 Takahashi et al. .......... 464/906
4,231,232 A 11/1980 Otsuka et al.
4,358,282 A * 11/1982 Yamamoto ................... 464/145
6,390,928 B1 5/2002 Welschof et al.
6,461,244 B2 10/2002 Meyer et al.
6,497,622 B1 12/2002 Bilz et al.

FOREIGN PATENT DOCUMENTS

| DE | 199 63 653 A1 | 7/2001 | |
|---|---|---|---|
| DE | 102 01 169 A1 | 8/2002 | |
| EP | 1 079 128 A1 | 2/2001 | |
| GB | 870758 | 6/1961 | |
| JP | 52-24650 | * 2/1977 | .......... 464/145 |
| JP | 8189533 | 7/1996 | |

OTHER PUBLICATIONS

Universal Joint and Driveshaft Design Manual, AE-7, Society of Automotive Engineers, Warrendale, PA, p. 147, TJ 1079.S62 1979.*

* cited by examiner

*Primary Examiner*—Greg Binda

(57) ABSTRACT

A constant velocity joint has an outer part, an inner part, and a full cage that is accommodated in a self-holding manner between these parts. The cage is formed with windows for holding balls inside races on the outer part and on the inner part. The cage is guided around a common center of curvature via spherical outer surfaces on the outer part and via spherical inner surfaces on the inner part. During assembly, the outer part and the cage can be slid inside one another in the direction of their component axes. This permits a particularly compact design of constant velocity joints with Stuber offset. Special openings on the outer part enable the balls to be inserted when the inner part is already connected to a shaft.

20 Claims, 7 Drawing Sheets

CONSTANT VELOCITY FIXED JOINT AND ASSEMBLY METHOD

CROSS-REFERENCE TO RELATED APPLICATIONS

This is a continuing application, under 35 U.S.C. § 120, of copending international patent application PCT/EP2004/003481, filed Apr. 1, 2004; this application also claims the benefit, under 35 U.S.C. § 119, of German patent application No. 103 17 146.0, filed Apr. 14, 2003; the disclosures of the earlier applications are herewith incorporated by reference in their entirety.

BACKGROUND OF THE INVENTION

Field of the Invention

The invention relates to a constant velocity fixed joint with an outer part, an inner part, and a full cage. The cage is accommodated in a self-holding manner between the outer and inner parts and it is provided with windows for holding balls in tracks on the outer part and the inner part. The cage is guided around a common center of curvature by way of spherical outer surfaces on the outer part and by way of spherical inner surfaces on the inner part. The outer part and the cage, when being fitted together, are able to be slid one inside the other in a direction of their component axes. The invention additionally relates to an assembly method for such a joint.

Concentricity within the meaning of this application also encompasses very slight axial deviations of the centers of curvature. However, the deviations do not then serve primarily to control the joint, as is the case in double offset cages. In the constant velocity fixed joint (Stuber offset) which is here of interest, this control is instead realized via ball tracks which are in each case offset relative to the spherical centering surfaces.

Due to their geometry, constant velocity fixed joints present particular assembly problems. Especially awkward is the installation of the cage and the balls between the inner part and the outer part, since between the cage and the outer part and the cage and the inner part, respectively, a guide in the style of a spherical cap is provided and the joint, in the assembled state, should not axially fall apart. The cage cannot therefore easily be inserted axially into its assembly position in the outer part.

In traditional constant velocity fixed joints, in the fitting together of the cage with the outer part, the component axes of the outer part and of the cage are firstly angled at about 90 degrees to one another. In this twisted state relative to the operating position, the cage is introduced into the outer part. The component axes are then mutually aligned by a subsequent twisting in the outer part.

Due to the cramped spatial conditions, in order to facilitate the pivoted introduction of the cage into the outer part and the subsequent twisting on the cage, recesses are provided, this preferably in the region of the windows of the cage, as is shown in U.S. Pat. No. 6,461,244 B2 and in its counterpart German patent application DE 102 01 169 A1. However, a weakening of the cage is fundamentally associated herewith.

Furthermore, U.S. Pat. No. 4,231,232 describes a constant velocity fixed joint in which, unlike in the joint type according to the invention, the control offset is realized in the ball cage. The center of curvature of the spherical outer surface is markedly axially offset relative to the center of curvature of the spherical inner surface of the ball cage. With this joint, an axial assembly is possible. For this purpose, the windows on the cage are made wider than usual. In addition, a recess is respectively placed before the windows in the direction of insertion. The cage is thereby able to be slid into the outer part between the webs projecting radially inward between the individual tracks of the outer part. In this case, the windows are firstly aligned relative to the webs. As a result of subsequent coaxial twisting by half a division, the cage then makes its way into its operating position, in which it is axially secured in the outer part.

The recesses which are necessary in the above-mentioned U.S. Pat. No. 4,231,232, however, entail a high production cost, weaken the cage and limit the maximal bending angle of the joint, since the ball guide surfaces of the cage are diminished in the radial direction. Moreover, cages of this design are made relatively thick-walled, whereby, in turn, the ball wrap in the tracks of the inner and outer part turns out to be correspondingly smaller.

SUMMARY OF THE INVENTION

It is accordingly an object of the invention to provide a constant velocity fixed joint and an assembly method which overcome the above-mentioned disadvantages of the heretofore-known devices and methods of this general type.

With the foregoing and other objects in view there is provided, in accordance with the invention, a constant velocity fixed joint, comprising:

an outer part formed with spherical outer surfaces and tracks;

an inner part formed with spherical inner surfaces and tracks;

a cage disposed between the inner part and the outer part, the cage having windows formed therein for holding balls in the tracks on the outer part and the inner part;

the cage being guided about a common center of curvature by way of the spherical outer surfaces and the spherical inner surfaces; and the outer part and the cage being configured to be slid one inside the other, during assembly, along a direction of the respective component axes thereof.

A constant velocity fixed joint constructed according to the invention now enjoys the benefits of axial assembly, even with a joint type in which the control offset is realized between the curved ball tracks and the centering ball surfaces (Stuber offset). In this joint construction, the spherical inner surface and spherical outer surface of the ball cage are made concentric or with only small axial offset. In this case, no cavities are necessary in the window region of the cage to allow the cage to be fitted into the outer part. The construction according to the invention additionally provides for the further development, from the space economy aspect, of benefits accruing from the axial assembly.

Preferably, the spherical outer surface of the cage is interrupted only by its windows, so that the cage is not weakened and can thus be made particularly thin-walled. This allows, in turn, a tendentially more compact shaping of Stuber offset joints.

The cage, in its operating position, is held in the centering ball of the outer part, which centering ball has an undercut. No additional axial securing elements are therefore required in order to support the cage in the outer part, whereby the manufacturing and assembly costs remain low despite axial insertion.

An advantageous embodiment is distinguished from the abovementioned prior art in particular by the fact that the distance L1 between the bell bottom of the outer part and the center of rotation M of the cage is less than the radius L2 of the spherical inner surface of the outer part.

Compared with traditional constant velocity fixed joints with bell-shaped outer part, a clear shorter axial constructional length and more compact design is hereby possible. In addition, a weight-saving is obtained. On a motor vehicle, the use of a constant velocity fixed joint according to the invention allows the pivot point of the joint to be shifted further outward and hence a tendentially small turning circle to be realized, since the bending capacity remains unchanged from traditional constant velocity fixed joints.

Preferably, the distance ratio L1/L2 amounts to less than 0.9, preferably less, even, than 0.8. A particularly compact design is obtained with distance ratios L1/L2 of less than 0.75.

According to an advantageous embodiment of the invention, the cage is beveled outward on its end face facing toward the bell bottom. The axial constructional length of the outer part can thereby be reduced still further.

This bevel of the cage lies preferably within an angular range of 15 to 40 degrees related to its end plane and, more preferably, within an angular range of 23 to 32 degrees.

Further, the included angle of the ball tracks can be configured such that, under operating load, the cage is supported in the outer part on the side to which the included angle of the tracks is facing. Usually, the ball cage, under operating load, rests in the joint, i.e. against the opening side of the outer part. This means that a reduction in the supporting surface through a bevel according to the invention has no adverse effect. In the case of a design in which the required free space were created by a smaller cage width, support area for the inner part on the internal diameter of the cage would be lost. A loss of support area on the inner part would increase the friction in the joint and adversely affects the component positioning, resulting in a reduction in the working life of the joint; moreover, the strength of the joint would be impaired, especially in respect of large bending angles. In contrast, the solution according to the invention offers a reduction in the required construction space without any losses in strength and function.

In order to facilitate assembly, according to a further, advantageous embodiment of the invention, the tracks on the outer part, at their outlet toward the opening side, are respectively provided with a radial cavity, such that, in a heavily angled position between the inner part and the outer part, an opening is formed with the track of the outer part, through which opening a ball can be introduced into the space formed between the associated tracks. As explained in greater detail below, this allows the balls to be easily inserted into the otherwise already ready-assembled arrangement comprising inner part, outer part and cage.

The axial assembly of the ball cage according to the invention can also be effected if the inner part and a profiled shaft are already assembled in the cage. In constructions according to the prior art, the profiled shaft, by contrast, would impede the insertion of the ball cage. One embodiment of the invention envisages that the balls are inserted after the inner part and the profiled shaft are already assembled. As a result of cavities in the region of the ball track outlets in the outer part, it is possible, in the assembly position, to angle off the profiled shaft to the point where it becomes possible to insert a ball, respectively, into the ball cage.

Preferably, the cavities are realized such that, when the operating bending angle is at a maximum, the ball support in the region of the track outlet is adequate. In this context, it is particularly advantageous if the ball tracks on the outer part have an elliptical or gothic cross section. In this case, the balls actually rest against the flanks and not directly against the bottom of the track, so that the cavities, which, above all, reach close to the track bottom, can be made relatively large without impairing the bearing characteristics.

For this purpose; it is also beneficial to use balls of large diameter. According to a further advantageous embodiment of the invention, balls are therefore provided which, in relation to a shaft provided on the inner part, have a diameter within the range 0.8 to 1.

In principle, the shaft can be configured as a profiled shaft, which is fixed in the inner part, for example, by means of a toothing. In addition, the invention opens up the possibility of providing joint shafts having a permanent connection between the shaft and the inner part. It is further possible to configure the shaft and the inner part in one piece. In the latter case, the tracks are then provided directly on a shaft portion which, if necessary, also has a greater diameter than the rest of the shaft. Connecting and securing elements between the shaft and the inner part can thereby be dispensed with. Moreover, cost benefits are obtainable in the manufacture and assembly of the individual parts. An additional functional benefit results from the fact that torsional plays, as can arise in traditional constructions between the notch toothing of a profiled shaft and the inner part, are reliably prevented. The lack of a toothing has a beneficial effect, moreover, upon the component strength, since a notch effect created by the connection remains absent.

With a view to the assembly of the balls, according to a further, advantageous embodiment of the invention the cavities at the track outlets of the outer part can be configured such that their contour matches that of the shaft when the shaft, in the ball-assembly angle, bears against the outer part. This allows an assembly process in which the balls, once outer part, inner part and cage are fitted together, are inserted into the windows of the latter, since very large ball-assembly angles can thus be realized despite the compact design of the joint.

The cavities can, for example, be forged. Since these have no operating function, the production accuracy requirements are relatively low.

Attached to the outer part, furthermore, can be a bellows having wall portions which protrude before the open track ends and which hold the balls at a maximal angling between the inner part and the outer part in the respective tracks. The balls are thereby prevented from possibly falling out of the cage. This is especially important when in handling, such as, for example, during transportation and fitting to the vehicle, the joint is angled off up to the ball-assembly angle.

As the joint is rotated during operation, the shaft stop comes to be situated at a lesser angle, thereby preventing the balls from possibly falling out during operation. This virtually means that, in a corresponding embodiment, the maximal bending angle of the joint during operation is less than the ball-assembly angle.

The constant velocity fixed joint which is described above is distinguished by a very flexible assembly, in which the sequence of inner part, outer part and cage is of no importance in the fitting together.

Unlike traditional constant velocity fixed joints, the axial assembly can also be conducted however, above all, when the inner part and a shaft provided thereon are already fitted on the cage, since, in the absence of a twisting of the component axes, the shaft does not get in the way during the assembly. It is immediately apparent that the manner of the assembly influences the design of the inner part and the shaft such that these two can now be configured in one piece.

A further advantage of the assembly method according to the invention is the automation potential which it offers, since only rectilinear, and hence relatively simple motions of the components one relative to another have to be performed.

According to an advantageous embodiment of the assembly method, the balls are inserted individually one after another into the cage fitted together with the inner part and the outer part, for which purpose, for each ball, the inner part is heavily angled relative to the outer part. The respective ball is then introduced, on the opening side of the associated track pair, into a window of the cage. Hereupon, the cavities provided on the outer part at the track outlets respectively broaden the access to the receiving track space in the heavily angled position and thus facilitate the assembly. Preferably, these cavities are additionally made such that, at the same time, a space for the immersion of a shaft provided on the inner part is created.

Other features which are considered as characteristic for the invention are set forth in the appended claims.

Although the invention is illustrated and described herein as embodied in a constant velocity fixed joint and assembly method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
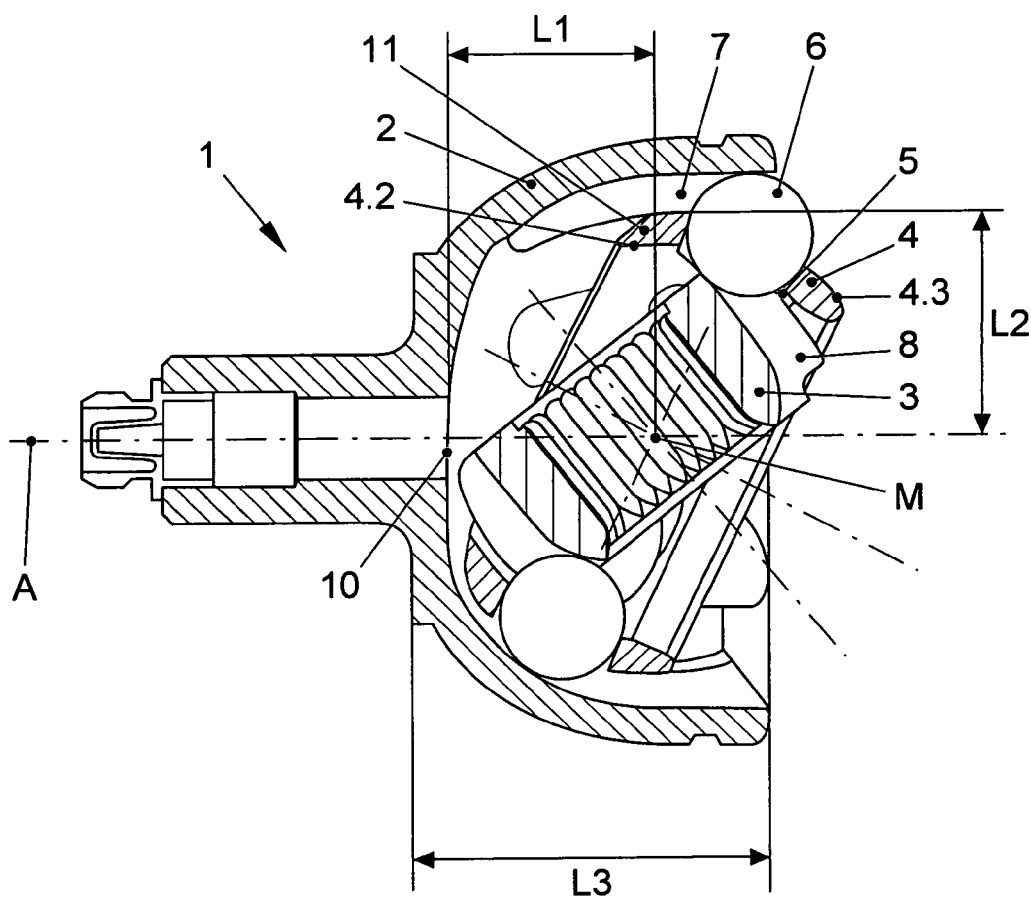
FIG. 1 is a longitudinal sectional view of an exemplary embodiment for a constant velocity fixed joint according to the invention.

Referring now to the figures of the drawing in detail and first, particularly, to FIG. 1 thereof, there is shown a longitudinal section through a first exemplary embodiment of a constant velocity fixed joint 1 for the transmission of torques with equalization of angles. The constant velocity fixed joint 1 comprises an outer part 2 of, for example, bell-shaped configuration, an inner part 3 disposed in the latter, and a cage 4, which is held between the outer part 2 and the inner part 3 pivotably about a center of rotation M. To this end, on the outer side and inner side of the cage spherically curved surfaces 4.2 and 4.3 are provided, which are guided in a slide-movable manner on respectively corresponding wall portions of the outer part 2 and of the inner part 3. The centers of curvature of the outer surfaces 4.3 and of the inner surfaces 4.2 lie in the center of rotation M. Although a very slight axial offset of the centers of curvature is possible, such an axial offset does not here serve to control the balls 6 into the half-angle plane. On the cage 4, a plurality of windows 5, distributed in the peripheral direction, are provided, which respectively receive a ball 6 and fully enclose these balls. The balls 6 are guided in groove-shaped tracks 7 and 8, which lie opposite one another in pairs on the outer part 2 and the inner part 3. Unlike in joints with double offset cage, the control is brought about by the curvature of the tracks 7 and 8 (Stuber offset). The spherical outer surfaces 4.3 and the inner surfaces 4.2 of the cage are only interrupted by the windows 5, yet are otherwise free from any recesses, flattenings, elevations or the like.

Figure 5:
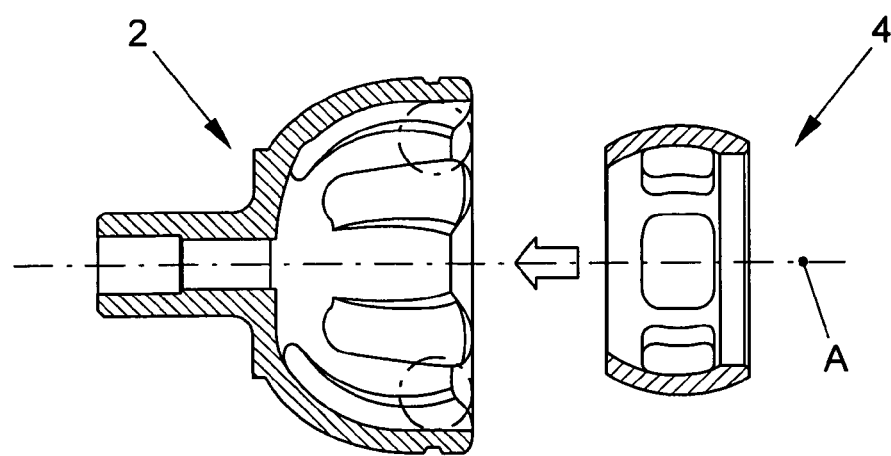
FIG. 5 shows a side view of the outer part and of the cage for illustration of the axial assembly.

Unlike traditional constant velocity fixed joints, in which, in the assembly, the cage 4 is introduced in an angled position into the opening in the outer part 2, in the illustrative embodiment according to the invention the outer part 2 and the cage 4 are configured such that these, when being fitted together, can be slid one inside the other in the direction of their component axes, as is shown in FIG. 5.

However, the new joint has an undercut in the centering ball of the outer part 2, so that the cage 4, in its operating position, is self-holding. No additional axial securing elements are therefore required in order to support the cage in the outer part.

Figure 2:
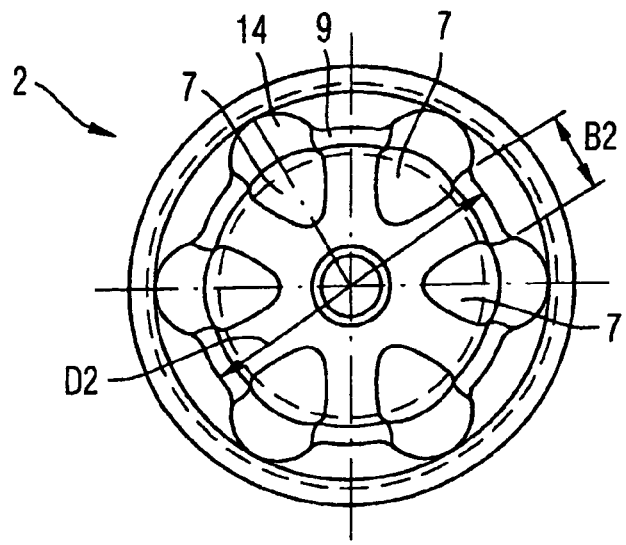
FIG. 2 shows a view, in the direction of insertion of the cage, of the outer part of the joint from FIG. 1.
Figure 3:
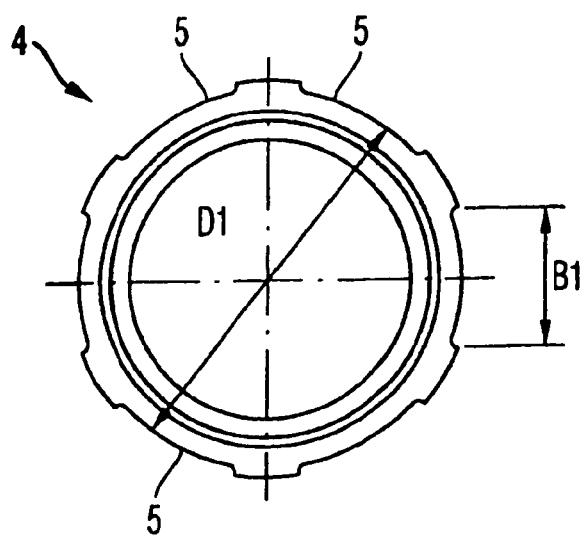
FIG. 3 shows a view according to FIG. 2 in the direction of vision onto the cage.
Figure 4:
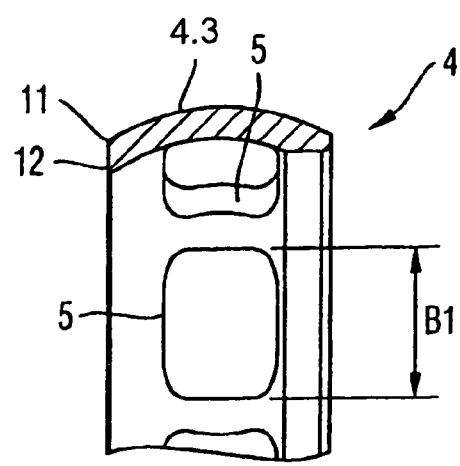
FIG. 4 shows a longitudinal sectional view of the cage.

In order to allow the axial assembly, the windows 5 of the cage 4 have in the peripheral direction a greater width B1 than webs 9 which are provided on the inner side of the outer part 2 and which separate adjacent tracks 7 one from the other. As can be gleaned, in particular, from FIGS. 2 to 4, the external diameter D1 of the cage 4, measured over the window sides, is less, moreover, than the internal diameter D2, measured on the opening side, of the outer part 2 between mutually opposing webs 9. In the assembly, the narrower webs 9 of width B2 thus fit between the windows 5. Here it is not necessary to provide an additional recess on the outer side of the cage 4 in the region of the windows 5, but nor is it ruled out. After having been slid axially together, the cage 4 and the outer part 2 are twisted approximately by half a division about the longitudinal axis A of the joint, so that the windows 5 come to lie between the respectively associated tracks 7 and 8 on the outer part 2 and the inner part 3.

A peculiarity of the constant velocity joint 1 according to the invention consists in the matching of the dimensions of the cage 4 to the internal dimensions of the outer part 2. As can be gleaned in particular from FIG. 1, the distance L1 between the bell bottom 10 of the outer part 2 and the center of rotation M of the cage 4 is less than the radius L2 of the spherical inner surface of the outer part 2. The distance ratio L1/L2 is here chosen such that the cage 4, at the desired maximal operational bending angle of the joint 1, specifically does not butt with its outer edge 11 against the bell bottom 10 of the outer part 2. With a view to a particularly compact design of the joint, in the axial direction distance ratios L1/L2 less than 0.9, or less, even, than 0.8, are advantageous.

The particular configuration of the joint 1 ensures strength characteristics which are not impaired by the obtained shortening of the axial length L3 of the outer part 2. At small maximal operational bending angles, distance ratios L1/L2 less than 0.75 are also conceivable.

Because of the shortening of the axial length L3 compared to traditional constant velocity fixed joints, on a motor vehicle the joint pivot point can be displaced relatively far in the outward direction. Consequently, the operational bending angles which occur during driving operation remain smaller. This can be used, in turn, to reduce the turning circle of the vehicle.

Figure 6:
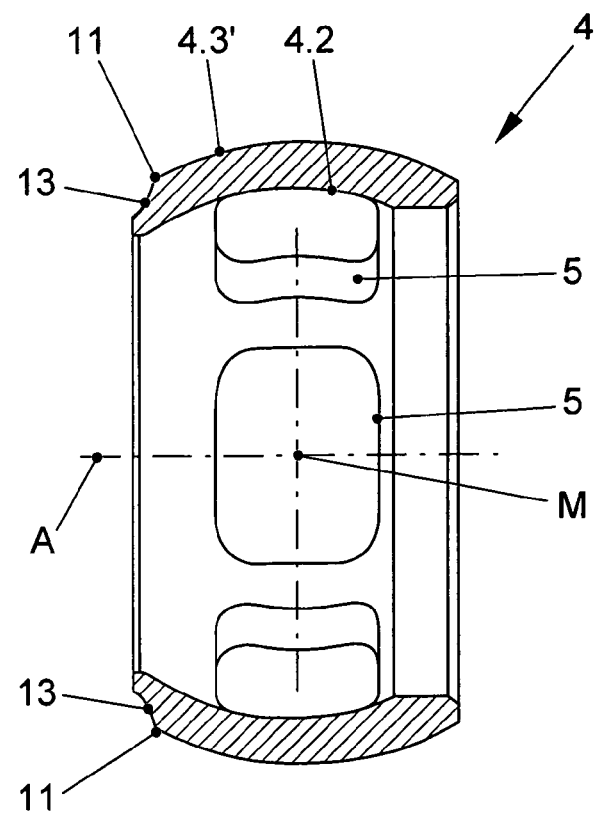
FIG. 6 shows a sectional view of the cage.

With a view to the most compact possible design, the solid cage 4 can additionally be modified on its inner side, as is represented in FIG. 6. The cage 4 which is there shown in longitudinal section is beveled outward on its end face 12 facing toward the bell bottom 10. Here, the bevel 13 of the cage 4 to its end face 12 lies within an angular range of 15 to 40 degrees, preferably within an angular range of 20 to 28 degrees. or between 23 and 32 degrees. As can further be seen from FIG. 6, the bevel 13 extends almost over the full thickness of the cage 4 and thus differs from a simple design stage. Preferably, the bevel 13 extends over at least half the cage thickness. FIG. 1 shows graphically the benefit which is derived with the bevel 13. In the ideal state, the bevel 13 is chosen such that, in the maximal bending of the joint 1, it runs approximately parallel to the bell bottom 10, whereby an optimal space utilization is obtained.

An impairment of the strength characteristics of the joint 1 is not associated herewith. The cage 4 is supported on the side to which the included angle of the tracks 7 and 8 is facing. In the represented, non-limiting illustrative embodiment, this means that the cage 4, under operating load, rests against the opening side of the outer part 2. At the same time, the cage 4 ensures a sufficient width for the support of the inner part 3.

Figure 7:
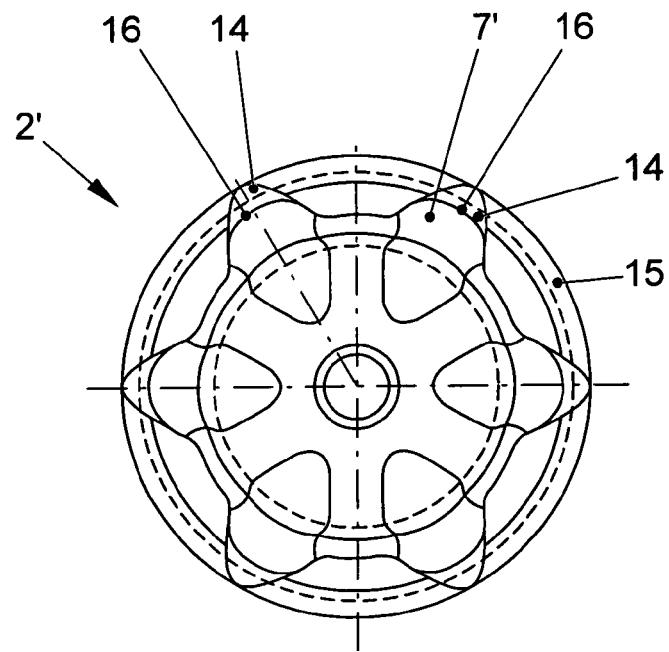
FIG. 7 shows a view, in the direction of insertion of the cage, of the outer part of a second illustrative embodiment according to the invention.
Figure 8:
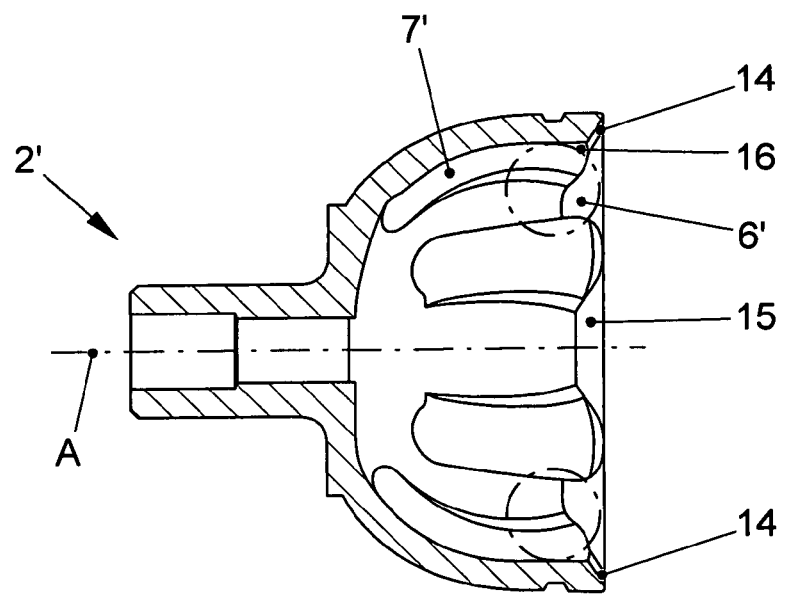
FIG. 8 shows a longitudinal sectional view of the outer part from FIG. 7.

In a modification represented in FIGS. 7 and 8, the tracks 7' on the outer part 2' are respectively provided with a radial cavity 14 at their outlet in the direction of the opening side. These cavities 14 start on the end face 15 of the outer part 2' and extend to the groove bottom 16 of the tracks 7. They are configured such that, in a heavily angled position between the inner part 3' and the outer part 2', an opening is formed with the track 7' of the outer part 2', through which opening a ball 6' can be introduced into the space formed between the associated tracks 7' and 8'. This is advantageous for the fitting of the balls 6' in the windows 5' of the cage 4', which fitting can thus be effected in the assembled state of outer part 2', inner part 3' and cage 4'. Through the use of ball tracks of elliptical or gothic cross section on the outer part 2', the radial cavities 14 are not strength-critical, even under maximal operational bending angles of the joint 1. The cavities 14 at the track outlets can be forged, for example, together with the tracks 7' and 8'. If the cavities 14 are made separately, the accuracy requirements can also be chosen such that they are less than for the tracks 7' and 8'.

Traditionally, the inner part is firstly fitted into the cage, after which cage and inner part are together fitted into the outer part, then angled off and the balls inserted one after the other and, finally, the shaft slid into the inner part.

The fitting of the joint 1 can be conducted in a variety of ways. In a joint according to the invention, an assembly unit consisting of profiled shaft, inner part 3 and cage 4 can be inserted into the outer part 2. The inner part 3 and the profiled shaft can also be permanently connected one to another or can be constructed in one piece. In traditional joints, this procedure would not be possible, because, if the component axes between the outer part 2 and the cage 4 were heavily angled, the shaft would get in the way.

As already indicated, the balls 6 can next be inserted. To this end, the inner part 3 is firstly heavily angled to the outer part 2. In this position (ball-assembly angle), the respective ball is introduced, on the opening side of the associated track pair 7 and 8, into a window 5 of the cage 4. The cavities 14 described in connection with FIGS. 7 and 8 here facilitate access to the receiving track space in the heavily angled position. It is also conceivable, however, to introduce the balls 6 into the tracks 7 and 8 without such cavities 14. The provision of the cavities 14, however, allows the ball-assembly angle to be kept smaller and thus the cage 4 to be less strongly pivoted when the balls 6 are inserted, which has a positive effect upon the design of the constructional length L3 of the outer part 2.

In this context, it is further advantageous if the balls 6 are large in relation to a shaft provided on the inner part (not represented here), i.e. the diameter relationship between balls 6 and shaft lies within the range 0.8 to 1. The cavities 14 at the track outlet of the outer part 2' are then preferably configured such that their contour matches that of the shaft when the shaft, in the ball-assembly angle, bears against the outer part 2'. In a favorable embodiment, the track outlet of the outer part 2' is thus designed such that precisely that volume which is taken up by the shaft in the ball-assembly angle is removed. Good access to the tracks 7' and 8' during assembly is thereby ensured.

Above all, however, the cavities 14 create a space into which the shaft of the inner part 3 can plunge in order to enlarge the assembly angle.

As already mentioned above, the time sequence for the installation of the cage 4 in the solution according to the invention is very flexible. For example, the cage 4 can firstly be inserted into the outer part 2. However, it is also possible first to fasten the cage 4 to the inner part 3 and then to introduce this, with the already fitted cage 4, axially into the outer part 2. The latter is particularly beneficial if the inner part 3 is already connected to the associated shaft.

Figure 9:
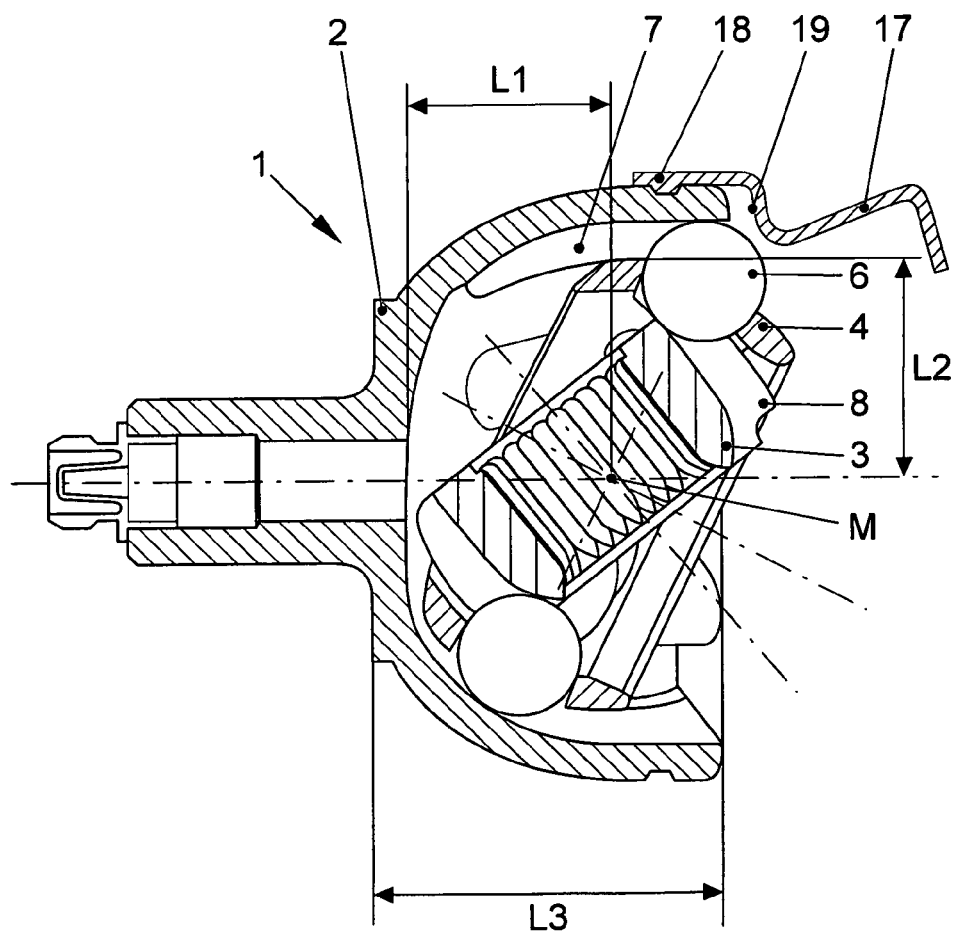
FIG. 9 shows a longitudinal sectional view of a further illustrative embodiment of a constant velocity fixed joint according to the invention.

In order to prevent the balls 6 from falling out during operation, the maximal bending angle of the joint during operation is set smaller than the ball-assembly angle. Yet, in transportation to the vehicle during assembly, the problem exists, for example, that the joint is inadvertently too heavily angled, namely up to the ball-assembly angle. In order, here too, to prevent the balls 6 from falling out, additional securement measures can be taken. In the modification represented in FIG. 9, this purpose is served by a bellows 17 attached to the outer part 2. Said bellows is fastened by a collar 18 to the outside of the outer part 2 and has at least one wall portion 19 which protrudes before the open track ends and holds the balls 6 in the respective tracks 7 and 8 when there is maximal angling between the inner part 3 and the outer part 2. As the joint is rotated during operation, the shaft stop lies at a smaller angle, so that the wall portion 19 serves predominantly as an assembly lock.

Figure 10:
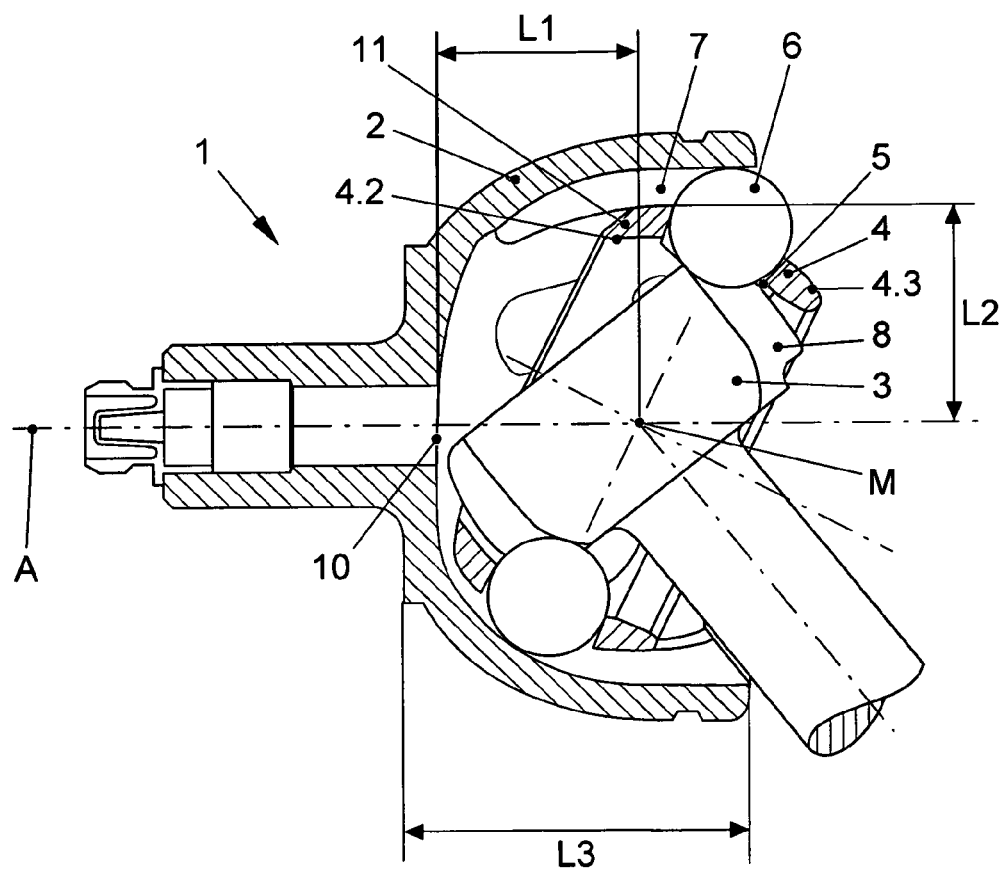
FIG. 10 is a view similar to FIG. 1, showing the shaft and the inner part of the assembly integrally configured in one piece.

FIG. 10 illustrates the constant velocity fixed joint with the shaft and the inner part integrally configured in one piece.

Figure 11:
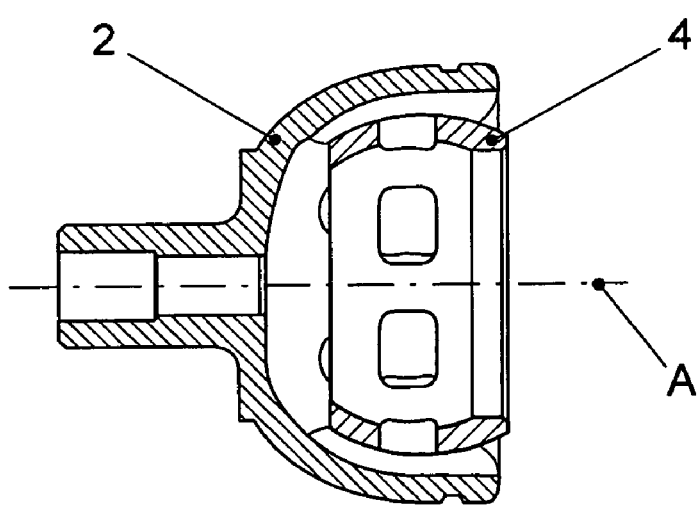
FIG. 11 is a longitudinal section illustrating the cage and the outer part of the first embodiment.

FIG. 11 shows the outer part and the cage of the first embodiment. The cage is in its operating position, rotated about its axis by a defined angle compared with the cage of FIG. 5.

The invention has been described in detail above with reference to preferred illustrative embodiments. It is also possible, however, to provide individual measures, such as, for example, the bevel 13 of the cage 4 or the cavities 14 on the outer part 2 or the assembly method for the balls or the assembly lock provided by the bellows 17, independently from one another, or even on traditional constant velocity fixed joints in which the assembly is carried out with pre-angled component axes.

In any event, with the present invention, a particularly compact constant velocity fixed joint of the Stuber offset type is created. Additional features enable assembly to be made considerably easier. In addition, the invention allows the use of one-piece or preconnected units comprising an inner part and a shaft. It is not limited to the illustrative embodiments represented above, but instead embraces all the solutions defined in the patent claims.

We claim:

1. A constant velocity fixed joint, comprising:
   an outer part having an axis and being formed with spherical inner surfaces and tracks;
   an inner part formed with spherical outer surfaces and tracks;
   a cage having an axis and being disposed between said inner part and said outer part, said cage having windows formed therein for holding balls in said tracks on said outer part and said inner part;
   said cage being formed with spherical inner surfaces and spherical outer surfaces having a common center of curvature;
   said cage being guided by way of said spherical outer surfaces thereof on said spherical inner surfaces of said outer part and by way of said spherical inner surfaces thereof on said spherical outer surfaces of said inner part; and
   said outer part and said cage being configured to be coaxially slidable one inside the other, during assembly, along a direction of the respective component axes thereof in a first rotational position with respect to each other and to be self-holding in a twisted second rotational position by an undercut formed by the spherical inner surfaces of said outer part.

2. The constant velocity fixed joint according to claim 1, wherein said cage, except for said windows, is formed substantially without assembly cavities or weaknesses.

3. The constant velocity fixed joint according to claim 1, wherein said outer part is a bell-shaped outer part formed with a bell bottom, and a distance between said bell bottom and said center of curvature of said cage is less than a radius of said spherical inner surface of said outer part from said center of rotation of said cage.

4. The constant velocity fixed joint according to claim 3, wherein a ratio of the distance between said bell bottom and said center of curvature to the radius is less than 0.9.

5. The constant velocity fixed joint according to claim 3, wherein a ratio of the distance between said bell bottom and said center of curvature to the radius is less than 0.8.

6. The constant velocity fixed joint according to claim 3, wherein a ratio of the distance between said bell bottom and said center of curvature to the radius is less than 0.75.

7. The constant velocity fixed joint according to claim 1, wherein said cage is formed with an inner-side end face, and said end face is formed with a radially outward bevel.

8. The constant velocity fixed joint according to claim 7, wherein said bevel encloses an angle of between 15° and 40° with said end face of said cage.

9. The constant velocity fixed joint according to claim 7, wherein said bevel encloses an angle of between 23° and 32° with said end face of said cage.

10. The constant velocity fixed joint according to claim 1, wherein said ball tracks have a defined included angle configured such that, under operating load, said cage is supported against opening-side portions on said outer part.

11. The constant velocity fixed joint according to claim 1, wherein said tracks on said outer part, at an outlet toward an opening side thereof, are respectively formed with a radial cavity, such that, in a relatively strongly angled orientation between said inner part and said outer part, an opening is formed with said track of said outer part, and an a ball is insertible through said opening into a space formed between associated said tracks.

12. The constant velocity fixed joint according to claim 11, wherein said cavities at the track outlets of said outer part are configured with a contour matching a contour of said shaft when said shaft bears against said outer part in the strongly angled ball-assembly orientation.

13. The constant velocity fixed joint according to claim 11, wherein said cavities are forged cavities.

14. The constant velocity fixed joint according to claim 11, wherein a maximum bending angle of the joint during operation is less than the strongly angled ball-assembly orientation.

15. The constant velocity fixed joint according to claim 1, wherein said tracks on said outer part have an elliptical or gothic cross section.

16. The constant velocity fixed joint according to claim 1, wherein said balls are large in relation to a shaft provided on said inner part.

17. The constant velocity fixed joint according to claim 16, wherein a diameter relationship between said balls and the shaft lies within a range from 0.8 to 1.

18. The constant velocity fixed joint according to claim 16, wherein the shaft and said inner part are integrally configured in one piece.

19. The constant velocity fixed joint according to claim 1, which further comprises a bellows attached to said outer part, said bellows having at least one wall portion projecting in front of the open track ends and holding said balls at a maximally angled orientation between said inner part and said outer part in the respective said tracks.

20. The constant velocity fixed joint according to claim 1, which comprises a centering ball formed with an undercut, and said cage, in an operating position thereof, is held in said centering ball.

* * * * *